No. 632,499. Patented Sept. 5, 1899.
A. KITSON.
SYSTEM FOR DISTRIBUTING FLUID UNDER PRESSURE.
(Application filed Mar. 6, 1899.)
(No Model.) 5 Sheets—Sheet 2.

WITNESSES:

INVENTOR
ATTORNEY

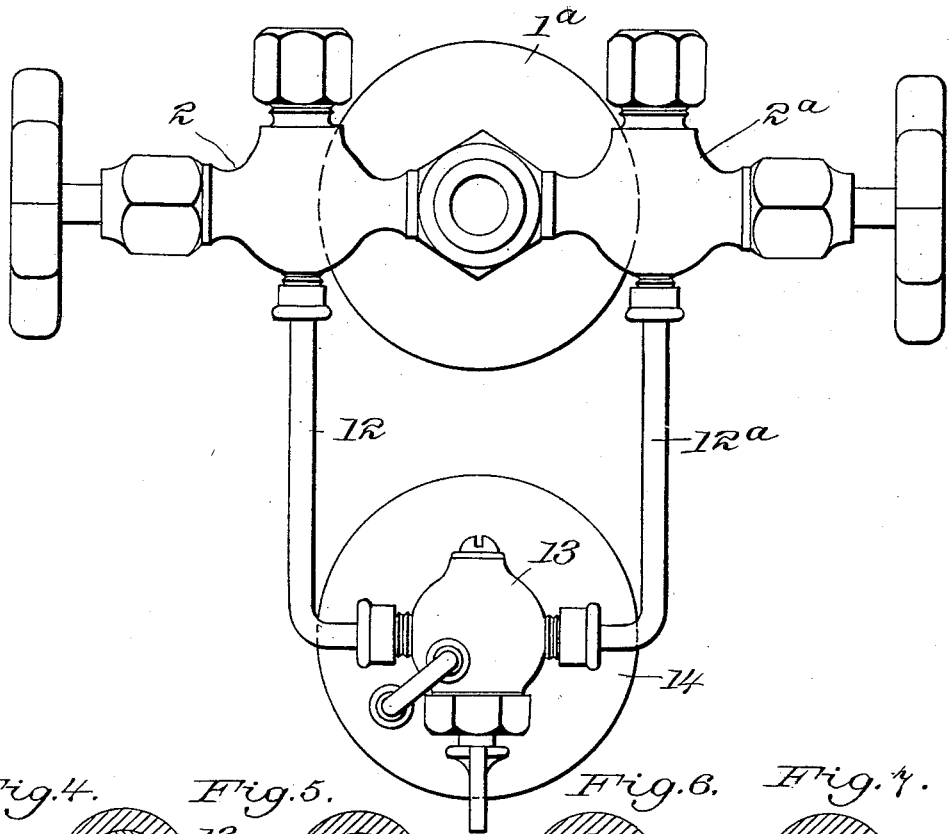

No. 632,499. Patented Sept. 5, 1899.
A. KITSON.
SYSTEM FOR DISTRIBUTING FLUID UNDER PRESSURE.
(Application filed Mar. 6, 1899.)
(No Model.) 5 Sheets—Sheet 4.

WITNESSES: INVENTOR
ATTORNEY

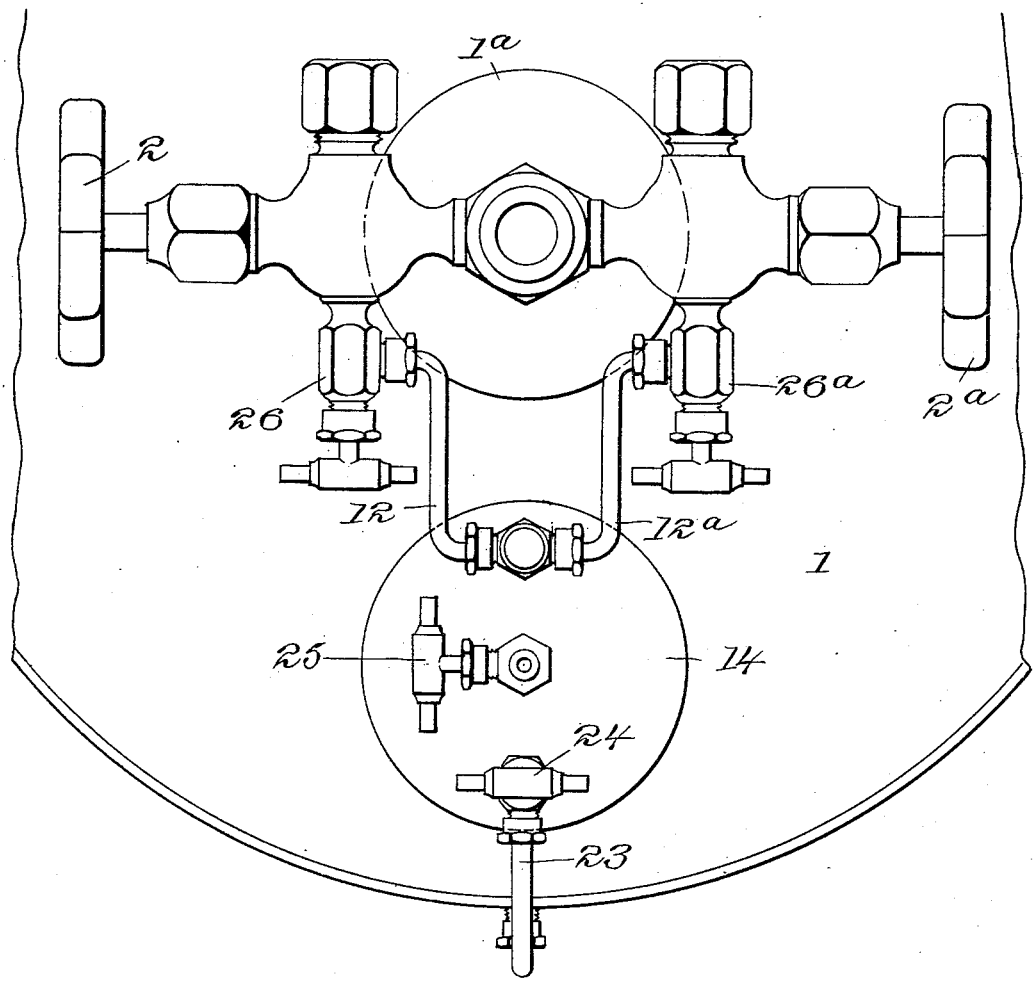

UNITED STATES PATENT OFFICE.

ARTHUR KITSON, OF PHILADELPHIA, PENNSYLVANIA, ASSIGNOR TO THE KITSON HYDROCARBON HEATING AND INCANDESCENT LIGHTING COMPANY, OF SAME PLACE AND CHARLESTON, WEST VIRGINIA.

SYSTEM FOR DISTRIBUTING FLUID UNDER PRESSURE.

SPECIFICATION forming part of Letters Patent No. 632,499, dated September 5, 1899.

Application filed March 6, 1899. Serial No. 708,024. (No model.)

*To all whom it may concern:*

Be it known that I, ARTHUR KITSON, a subject of the Queen of Great Britain, and a resident of Philadelphia, county of Philadelphia, State of Pennsylvania, have invented certain new and useful Improvements in Systems for Distributing Fluid under Pressure, of which the following is a specification.

My invention relates to systems for distributing fluid under pressure and draining the oil left in the system of piping when the supply is shut off back into the reservoir.

It is more specifically designed for application to systems of piping employed in supplying kerosene-oil or other fluid hydrocarbon to a series of lamps and embodies an improvement on certain features of apparatus covered in my Patent No. 602,223, granted April 12, 1898.

The preferred form of apparatus and certain variations thereof are illustrated in the accompanying five sheets of drawings, in which—

Figure 1:
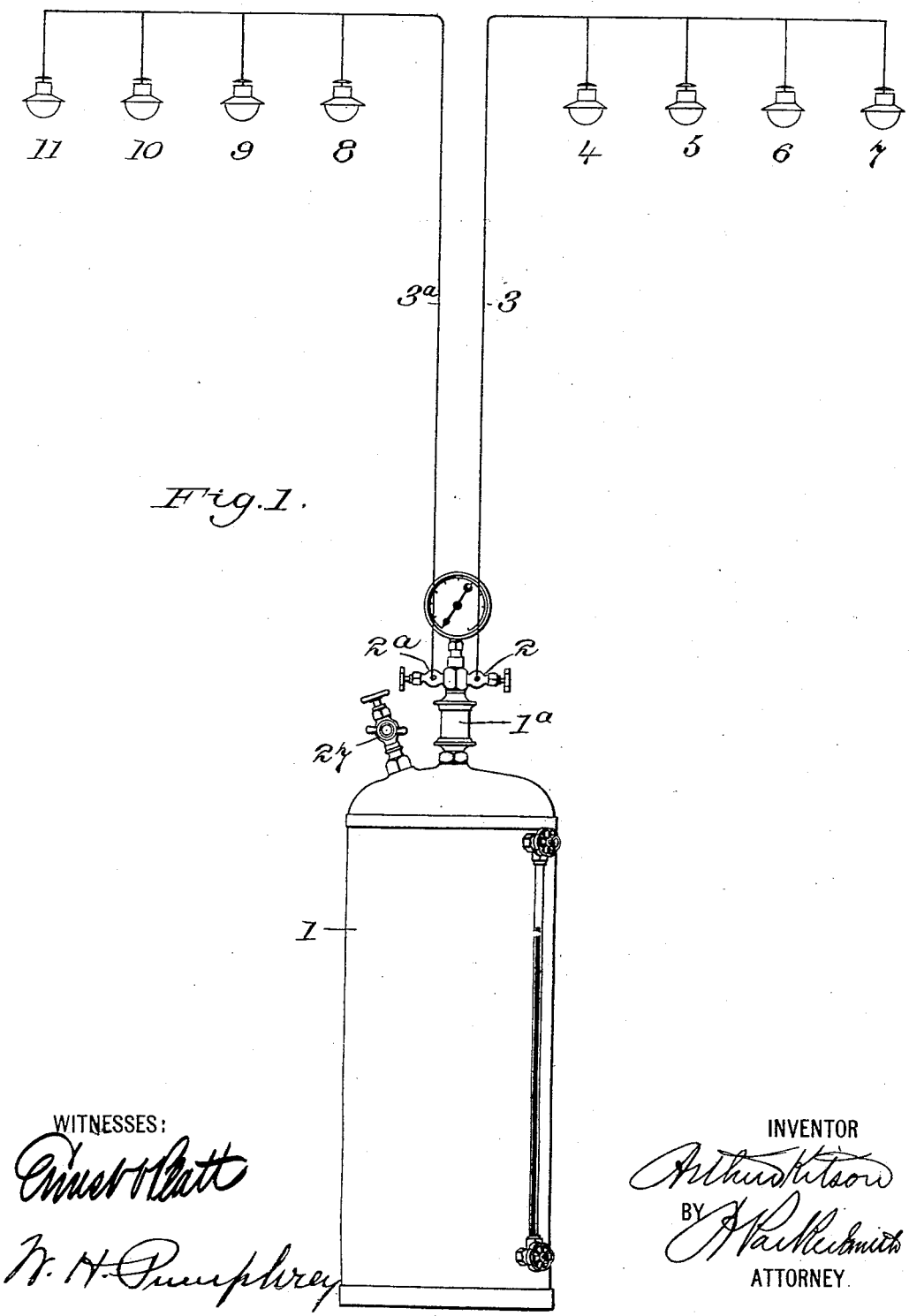
Figure 2:
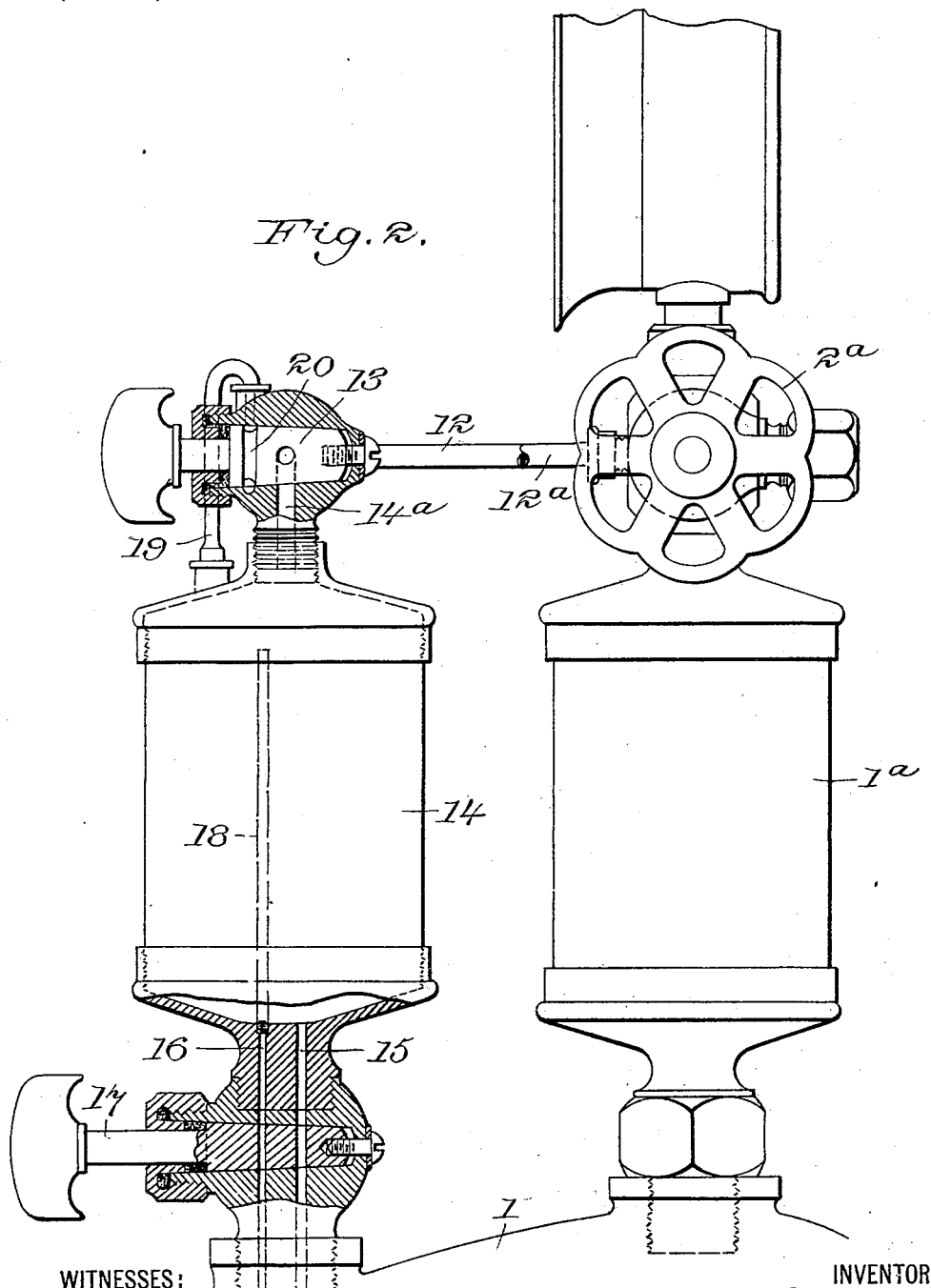
Figure 12:
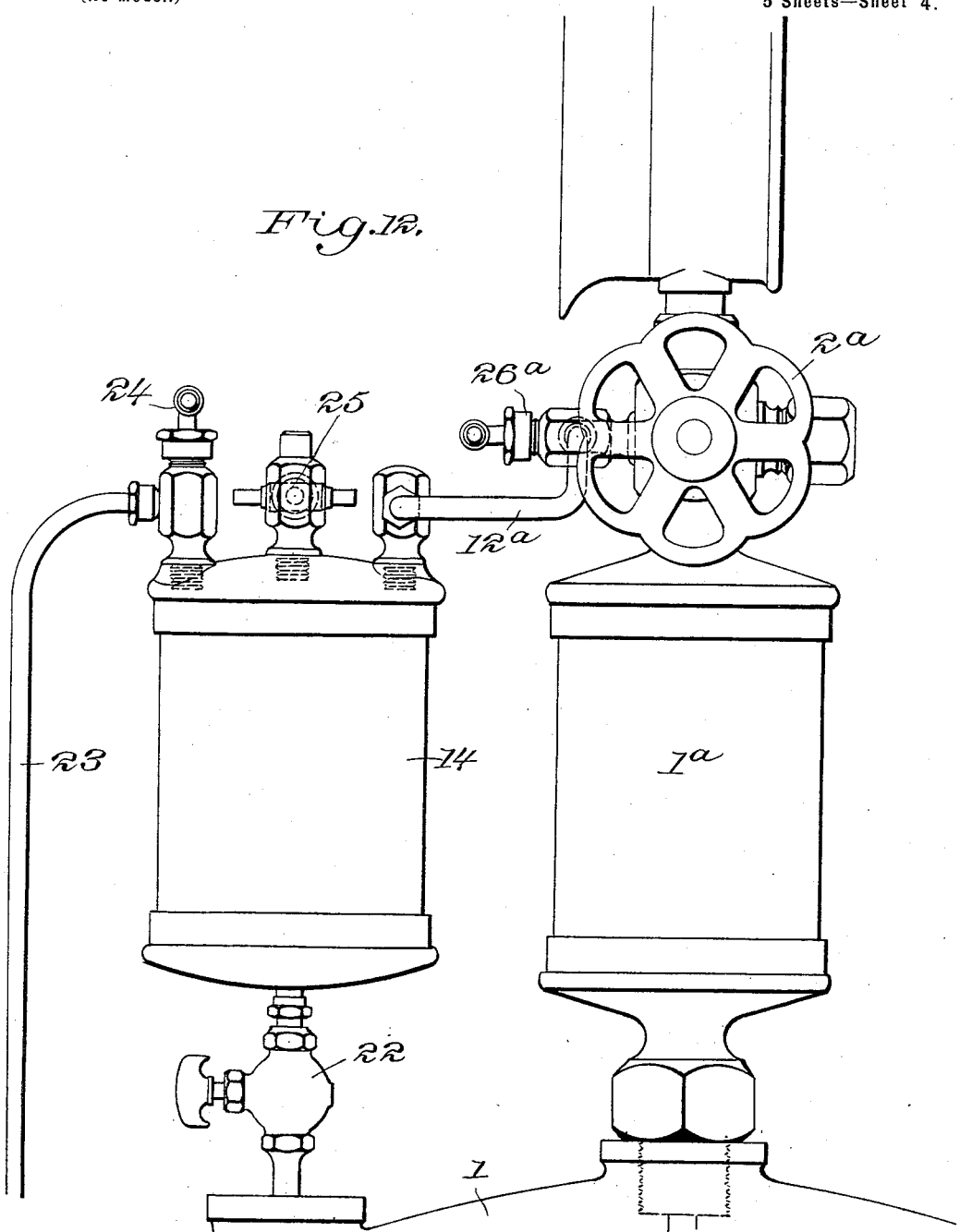

Figure 1 is a diagrammatic view of a double system of piping attached to the reservoir. Fig. 2 is an enlarged detail view of one form of drip-can and connections, with parts shown in section. Fig. 3 is a plan view of same. Figs. 4 to 11 are detail sections of the three-way cock and air-vent cock employed on my double system. Fig. 12 is a side elevation in detail of a modified form of drip-can and connections. Fig. 13 is a plan view of the construction shown in Fig. 12.

Throughout the drawings like reference-figures refer to like parts.

The usual air-tight tank or reservoir 1 is employed, in which is stored a quantity of oil or other fluid under pressure. This pressure is preferably produced by forcing in compressed air to the upper portion of the tank through the valve and connection 27. On top of the tank is a connection, preferably in the shape of a filter $1^a$, on top of which is mounted the pressure-gage shown. From this connection are one or more delivery-passages controlled by valves 2 $2^a$, which are connected with the systems of piping 3 $3^a$. One of these systems of piping, as 3, supplies the series of lamps 4 5 6 7, and the other supplies the second series 8 9 10 11.

Connected to the valve-chambers 2 $2^a$ or to the pipes 3 $3^a$ by other means are the pipes 12 $12^a$, which lead to a four-way valve 13. This valve is connected by the passage-way $14^a$ with the drip-can 14, which is made in the form of an air-tight chamber, preferably mounted on top of the reservoir 1; but wherever mounted it should always be above the fluid-level in the said reservoir. This drip-can has a connection 15 from its bottom portion to the reservoir 1 and also a connection 16, extended, by means of the pipe 18, to the upper portion of the interior of said drip-can. These connections may be controlled in any way, as by a common plug-valve 17. There is also an air-vent 19 from the upper portion of the drip-can, controlled by a valve, said valve in the construction shown in Figs. 2 to 11 being formed in the same plug as valve 13 by a circular passage-way 20, which comes opposite the inlet from pipe 19 and also opposite the outlet 21, communicating with the atmosphere.

In the slightly-modified construction shown in Figs. 12 and 13 the drip-can 14 has the lower portion of its interior connected with the reservoir 1 by a simple valve 22, while the upper portion of its interior is connected with said reservoir by the pipe 23, controlled by the valve 24. The air-vent is controlled by a separate simple valve 25, and the drip-can is connected with the systems of piping by separate simple valves 26 $26^a$.

The method of operation of my invention is as follows: When the lamps are operating, the valve 13 is thrown into position shown in Fig. 5, whereby the two systems of piping 3 $3^a$ are equalized so long as the valves 2 $2^a$ are open. The drip-can is thus cut off from connection with the systems of piping, and the valve 20 being in the position shown in Fig. 9 the air-vent is closed. The valve 17 may be opened or closed. When it is desired to shut off both the systems of piping and the lamps operated therefrom, the valves 2 $2^a$ are closed, and the valve 13 is turned in the position shown in Fig. 4, the valve 17 having first been closed. The turning of the valve 13, as described, turns the valve 20 in the position shown in Fig. 8 and leaves the air-vent 21 open. Accordingly the oil in the systems of piping 3 3ᵃ runs back by gravity into the drip-can 14. The valve 13 is then turned back to the position shown in Fig. 5, which closes communication also between the opening 21 and the vent-pipe 19 and shuts off the drip-can from the air. The valve 17 is then opened, as shown in Fig. 2, and the pressure from the reservoir 1 rising through the pipe 18 equalizes the pressure on the oil in the drip-tank 14, and it accordingly runs down through the passage-way 15 back into the reservoir. The valve 17 is then shut off and the system is ready for turning on the oil to the pipe systems for another operation of the lamps. If it is desired to shut off and drain only the system of piping 3, the valve 2 only is closed and the valve 13 is turned in the position shown in Fig. 6, the operation of the drip-can and connecting-valves following as before. If it is desired to shut off the system of piping 3ᵃ, then the valve 2ᵃ is closed and the valve 13 is thrown in the position shown in Fig. 7.

The modification shown in Figs. 12 and 13 is operated in substantially the same way, except that the independent valves 26 26ᵃ are operated to allow the flowing back of the oil into the drip-can, and the vent-cock 25 is opened when valves 22 24 are closed and closed when valves 22 24 are opened to allow the oil to run back into the reservoir.

The advantages of my invention consist in the withdrawal of oil from the systems of piping while the lamps are not in use, thereby diminishing the chance of leakage and permitting repairs to be made to the piping without spilling the oil, in the saving of the oil so drawn back without at the same time losing any substantial amount of the compressed air stored in the reservoir-tank, and in the possibility of operating several branch systems of piping by one valve when the construction shown in Figs. 2 to 11 is employed.

It is evident, of course, that various changes could be made in the details of construction of valves and connections shown without departing from the spirit and scope of my invention, so long as the relative arrangement of parts shown in the drawings or the principle of operation disclosed in the specification is preserved.

Having therefore described my invention, what I claim as new, and desire to protect by Letters Patent, is—

1. The combination of the reservoir, the distributing system of pipes, the air-tight drip-can above the level of the top of the reservoir, and connections from the system of pipes to the drip-can, and from the drip-can to the reservoir.

2. The combination of the reservoir, the distributing system of pipes, the air-tight drip-can above the level of the top of the reservoir, and connections from the system of pipes to the drip-can, and from the drip-can to the reservoir, together with the air-vent from said drip-can.

3. The combination of the reservoir of fluid under pressure, the distributing system of pipes connected thereto, the air-tight drip-can above the level of the top of the reservoir, valve-controlled connections from the reservoir to the upper and lower portions of the drip-can interior, and a valve-controlled connection from the pipe system to the drip-can.

4. The combination of the reservoir of fluid under pressure, the distributing system of pipes connected thereto, the air-tight drip-can above the level of the top of the reservoir, valve-controlled connections from the reservoir to the upper and lower portions of the drip-can interior, and a valve-controlled connection from the pipe system to the drip-can, together with the valve-controlled air-vent from said drip-can.

5. The combination of the reservoir of fluid under pressure, the distributing system of pipes connected thereto, the air-tight drip-can above the level of the top of the reservoir, valve-controlled connections from the reservoir to the upper and lower portions of the drip-can interior, and a valve-controlled connection from the pipe system to the drip-can, together with the valve-controlled air-vent from said drip-can, and connecting mechanism whereby the vent is open only when the pipe connection is open.

6. The combination of the reservoir of fluid under pressure, the duplex system of piping therefrom, the air-tight drip-can connected to the reservoir, and the three-way valve connecting said pipe systems with the drip-can.

7. The combination of the reservoir of fluid under pressure, the duplex system of piping therefrom, the air-tight drip-can connected to the reservoir, and the three-way valve connecting said pipe systems with the drip-can, together with the air-vent from said drip-can and mechanism whereby said air-vent is open when the three-way valve is so placed that either of the pipe systems is connected with the drip-can, and closed only when both systems are shut off from the drip-can.

Signed by me at Philadelphia, Pennsylvania, this 24th day of February, 1899.

ARTHUR KITSON.

Witnesses:
J. W. RICH,
LOUIS R. BAKER.